Patented Apr. 23, 1929.

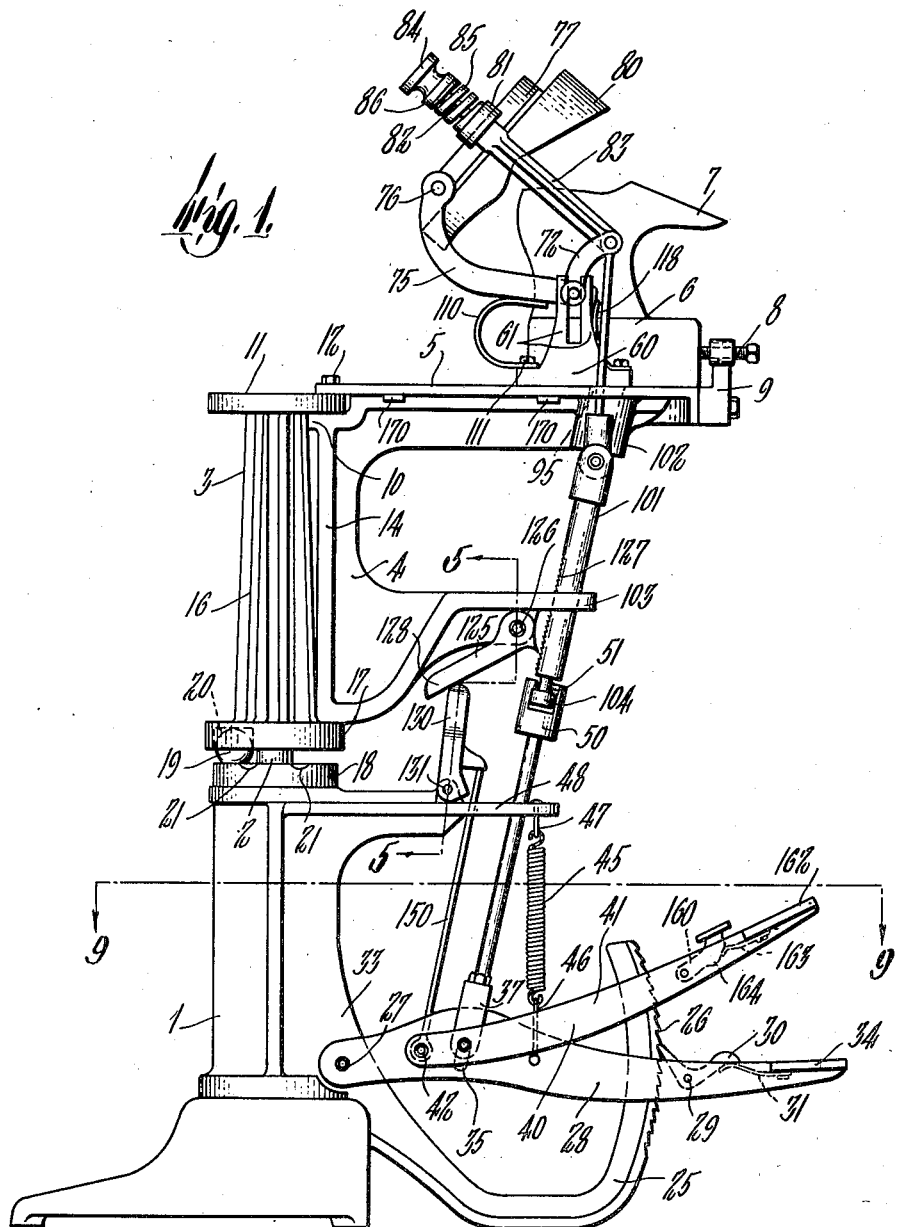

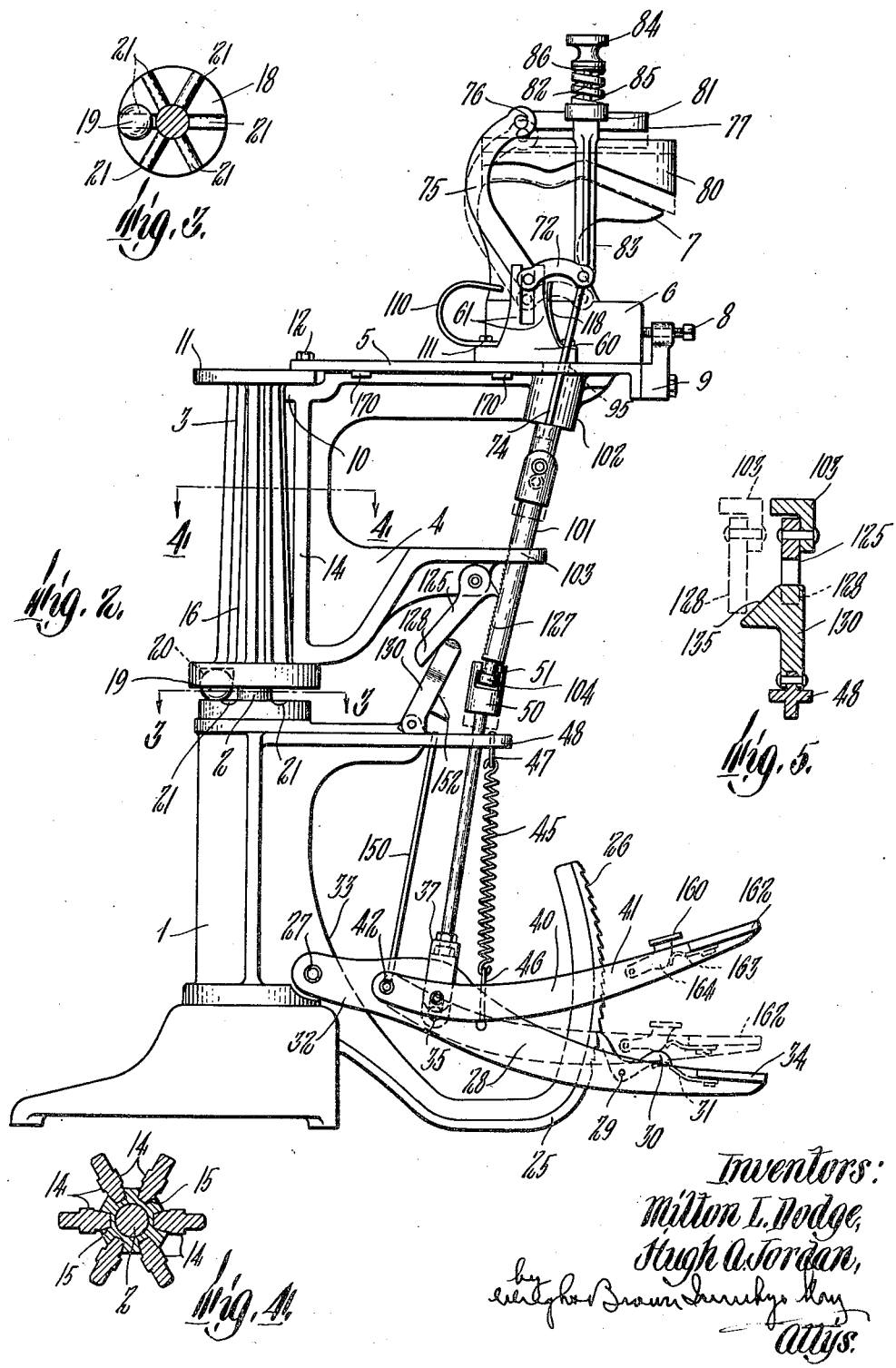

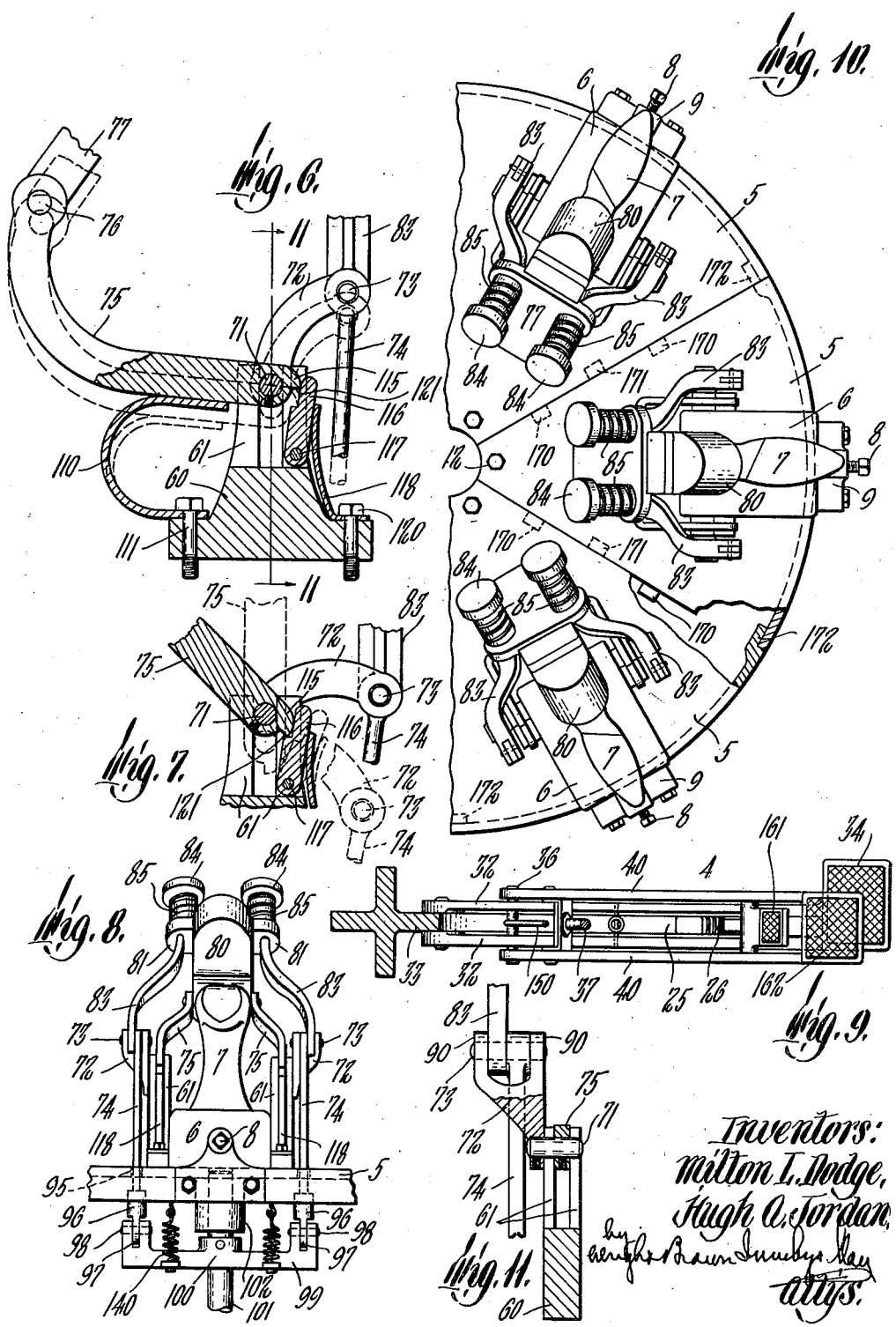

1,709,842

UNITED STATES PATENT OFFICE.

MILTON L. DODGE AND HUGH A. JORDAN, OF NEWBURYPORT, MASSACHUSETTS; SAID JORDAN ASSIGNOR TO SAID DODGE.

MOLDING MACHINE.

Application filed October 18, 1926. Serial No. 142,318.

This invention relates to molding machines, more particularly to that type suitable for molding shoe soles. As heretofore constructed such machines have commonly been provided with a pair of molding mechanisms, one of which is performing the molding operation, while the other is in condition for the removal of a molded sole, and the reception of a sole to be molded. These two mechanisms are changed from one to the other condition simultaneously. It is often desirable, however, that the molding action be continued for a period longer than is necessary to remove a molded sole and to replace it with an unmolded sole, but if this is done with a machine constructed as hereinbefore described, the capacity of the machine is materially reduced.

In order to provide maximum capacity while increasing the time of the normal molding operation, the machine embodying the present invention is provided with more than two molding mechanisms, which are so arranged that when one is in condition to discharge and receive work, all the others are in molding condition, and in order that an operator may more conveniently and expeditiously remove and replace work, the several mechanisms are arranged in a movable series, so that the mechanism which is in condition to discharge and receive work at any time, is positioned at a station convenient to the operator.

According to this invention also, the forms which receive the sole are vertically stationary, the upper forms being movable toward and from cooperating relation therewith. Provision is made, also, for the upper forms to move directly toward the lower forms to apply molding pressure to the sole, and when these upper forms are sufficiently removed from the lower forms they are caused to move out of the way rearwardly, so that the placing and removal of the work is facilitated.

Means are also provided whereby the pressure is applied by the operator, the forms being held in pressure applying relation until they reach or nearly reach the work discharging and receiving station, when the pressure is automatically released and the upper form removed.

For a more complete understanding of this invention reference may be had to the accompanying drawings in which Figure 1 is a side elevation of the machine showing but a single molding mechanism, and that mechanism in its work receiving and discharging station.

Figure 2 is a similar view, but showing the upper form approaching position to apply molding pressure to the sole.

Figures 3 and 4 are detailed sections on line 3—3 and 4—4 respectively of Figure 2.

Figure 5 is a detailed section on line 5—5 of Figure 1.

Figure 6 is a detail partly in section of the upper form moving mechanism.

Figure 7 is a fragmental view showing certain parts illustrated in Figure 6 in different positions.

Figure 8 is a front elevation of a molding mechanism.

Figure 9 is a section on line 9—9 of Figure 1.

Figure 10 is a fragmental top plan of the machine.

Figure 11 is a detailed section on line 11—11 on Figure 6.

Referring first to Figures 1 and 2, the machine is shown as comprising a standard 1 having a spindle 2 extending vertically therefrom. On this spindle is journaled a head 3. To this head are attached a series of brackets 4, only one of which is shown in Figures 1 and 2. Each of these brackets is provided with a top table portion 5, which as shown best in Figure 10 is formed of generally sector shape. Each of these table portions supports a lower molding form or block 6 having its upper face 7 shaped to the desired contour to which it is desired to mold the shoe sole. Each of these molding forms may be attached to the table top in any usual manner and as herein shown an adjusting screw 8 threaded through an upstanding perforated block 9 fixed to the outer edge of each table member may be used to adjust the block 6 and fix it in adjusted position.

Each of the brackets 4 is provided with a rearward extension 10 adjacent to its upper end, which is engageable between a circular top plate 11 at the upper end of the head 3, and the rearward end of the table portion 5 is constructed to overlie this plate 11 and to be fixed thereto by means of a cap bolt 12. Below the extension 10, each bracket has a vertical wall portion 14, which is adapted to engage in a mating vertical groove 15 of the stem portion 16 of the head 3, as shown in Figure 4 there being six of these grooves 15 for the reception of six brackets 4. A greater or less number of grooves and brackets might be employed if desired however.

The lower rear end of each of the brackets 4 rests on the upper face of a base plate 17 of the head 3, and between this base plate and mating circular plate 18 at the top of the standard 1 is positioned an element, herein shown as a ball 19, engaging in a socket portion 20 in the under face of element 17 and resting on the upper face of plate 18. This ball furnishes an antifriction bearing for the head 3 and also, in conjunction with a series of radially extending grooves 21 on the upper surface of plate 18, provides steps or stations in which the head 3 will naturally tend to remain in the course of its turning about the spindle 2.

These grooves 21 and the ball are so related that at each of these stopping positions one of the molding mechanism is in a desired angular position to properly cooperate with mechanism by which the molding mechanism in that station may be placed in molding condition. At that angular position the standard 1 is provided with a ratchet arm 25, extending outwardly from the axis of rotation of the head 3 and having ratchet teeth 26 cut on its outer face along an arc struck about an axis 27 passing through the standard 1 on which is pivoted a treadle 28. This treadle has pivoted thereon at 29 a locking dog 30, which is normally pressed into locking engagement with the ratchet teeth 26 by means such as a spring 31.

This treadle, as shown more particularly in Figure 9, comprises a pair of spaced treadle arms 32, one extending on either side of the vertical web portion 33 of the standard 1 and joined at their outer ends by means of a tread plate 34. Each of these treadle arms 32 at an intermediate point in its length is slotted as at 35, and through this slot extends a pin or shaft 36. On this shaft between the treadle arms 32 is pivoted the lower end of pull rod 37. Outwardly of the arms 32, the pin or shaft 36 is fixed to a second pair of spaced treadle arms 40. These treadle arms together form a second treadle 41 fulcrumed on the treadle 28 by means of the pin 42. The pull rod 37, thus has a lost motion connection with the treadle 28, but is pivoted directly to the treadle 41 fulcrumed on the treadle 28. By depressing the foot plate 34, the pull rod 37 may be lowered after the shaft 36 has come into contact with the upper end of the slot 35. When this has been accomplished to the desired extent and the treadle 28 is locked in position by means of the ratchet mechanism, the treadle 41 may be depressed about its fulcrum 42, thus causing a further downward movement of the pull rod 37 as far as may be permitted by the length of the slots 35, this depression of the pull rod being accomplished through a shorter lever-arm than before this being the distance between the pins 36 and 42, and consequently a much increased pressure may be exerted on the pull rod 37 through this change of leverage.

The treadle 28 is spring-pressed upwardly as far as may be permitted by the engagement of the dog 30 and the ratchet key 26, by any suitable means, as, for example, the coil spring 45 engaging at its lower end in link 46 fixed to the treadle 28 and at its upper end engaging an eye 47 fixed to a member 48 extending outwardly from the standard 1. The pull rod 37 carries at its upper end a head 50, having a dovetail slot 51 in its upper end for a purpose which will later appear.

On either side of each form 6 and supported on the table 5 is a block 60, having its upper end slotted downwardly at right angles to form four spaced upstanding post portions 61. In one of these slots rides a pivot pin 71, this pivot pin extending outwardly from the form 6. To one end of this pivot pin, outwardly of the posts 61, is fixed an arm 72, which, as shown best in Figures 1, 2 and 6, is forwardly curved and has depending from its forward end, and pivoted thereto at 73 a rod 74.

Between the posts 61 the pivot 71 has fixed thereon the lower end of an arm 75. The opposite ends of each pair of arms 75 is pivoted at 76 to a block 77 to which may be fixed by any suitable means the upper molding form 80. This block 77 and the molding form should be formed complementary in any suitable or usual manner by which any selected one of a plurality of forms may be attached thereto in position to properly cooperate with the form 7 in molding the sole. As such constructions are well known in the art, no detail showing is believed necessary in this case.

The block 77 is shown as provided with a pair of laterally extended ears 81, each of which is perforated for the passage of the reduced upper extremity 82 of a link 83. This upper extremity is preferably threaded at its extreme end and on this end may be threaded a nut 84 by which tension may be produced to an adjustable extent on a coiled spring 85 reacting between a washer 86 beneath the nut 84 and the upper face of the ear 81, which may be formed with a suitable seat therein to receive the lower end of the spring. The lower end of each of the links 83 is pivoted on the pivot 73 carrying the rod 74, both rod 74 and the link 83 passing between spaced jaws 90 of the arm 72 (Figure 11). Each of the rods 74 extends through a slot 95 in the table top 5 and has a head 96 fixed to its lower end, each head having a portion of reduced thickness as at 97 pivoted on a pin 98 to a yoke member 99. Each yoke member has attached thereto the pair of rods 74 with which each of the molding mechanisms is provided.

At the center portion of this yoke 99 it is provided with a perforated boss 100, through which passes a rod 101 slidably guided in a guide opening formed in a boss 102 integral with the bracket 4, and depending from the table portion 5, in its central radial axis. The yoke 100 is fixed to the rod 101, which extends downwardly through a guide opening in a support 103, also carried by the bracket 4. When the head 3 is positioned in any of its positions wherein the ball 19 engages in one of the slots 21, one of the rods 101 is positioned in substantially axial alinement with the pull rod 37, so that a headed element 104 on its lower end may engage within the dove tail opening of the head 50, whereby on depressing the treadles 28 and 41, the rod 101 may be pulled downwardly, thus pulling on the rod 74.

When the upper form 80 is out of operative relation to the form 7, as in the position shown in Figure 1, each of the arms 75 is turned backwardly and rests on a suitable support such as a U-shaped spring arm 110, the lower end of which is fixed as by means of a bolt 111 to the corresponding block 60. Initial downward movement of the rods 74 acts to swing the arm 75 upwardly, the links 83 moving forwardly and also swinging as a unit with the arms 75 and the arms 72 about the pivot pin 71 as an axis. In this initial swinging movement a latch lug 115 (see Figures 6 and 7) extending from the forward end of each of the arms 75, rides downwardly against the inner face of a dog 116, pivoted at 117 between the forward pair of posts 61 of the block 60, this dog being normally pressed rearwardly as far as is permitted by engagement of its upper end with the latch lug 115 by means of a leaf spring 118, the upper end of which engages the forward face of the dog 116, and the lower end of which is fixed to the block 60 as by means of the bolt 120. This engagement between the latch lug and the dog takes place until the latch lug engages a shoulder 121 on the dog. As soon as this engagement has been effected, as shown in Figure 7, further downward movement of the rods 74 causes the dog 116 to swing forwardly against the action of the spring 118 until the latch lug slips off from the shoulder 121. Until this is done the pivot shaft 71 remains substantially stationary vertically but rocks within the slot between the posts 61. As soon as this disengagement of the latch lug from the shoulder has taken place, however, the dog is pressed inwardly against the outer face of the arm 75, the lower end of which is then in substantially vertical figure, as shown by dotted lines in Figure 7 and further downward motion of the rods 74 then acts to produce a sliding motion of the pivot pins 71 downwardly in their slots, thus to bring the form 80 to its final molding position. The sole being placed on the form 7 and the form 80 being depressed thereagainst by such vertical motion the molding pressure is applied in proper relation to the lower form 7 without a lateral component. It is desirable, however, that when the upper form is raised, it may be moved bodily away from vertical alinement with the lower form in order to facilitate the removal and placing of soles molded and to be molded respectively, with relation to the lower form 7. On initial pressure being applied to the treadle 28, therefore, the upper form 80 is swung over into the proper vertical alinement with the form 7, and is then pulled toward the form 7 by a vertical motion only, the final heavy molding pressure being applied by pressure on the treadle 41, which causes the weight of the operator to be more effective through the increased leverage to apply the desired heavy pressure. As this is done a locking dog 125, pivoted at 126 to the bracket 4 beneath the guide support 103 engages in the ratchet teeth 127 cut into the side of the rod 101. This dog 125 has an arm portion 128 which acts as a weight to tend to hold this dog in operative relation with the ratchet teeth 127. As the pressure is applied the springs 85 are somewhat compressed so that when the treadles are again raised and the dog 125 has locked the rod 101 in the depressed position yielding pressure is exerted on the sole positioned between the upper and lower forms. The sole being now in molding relation, the head 104 may be disengaged from the head 50 and the work table, comprising the series of brackets 5 and the head 3 may be rotated until the adjacent molding mechanism has arrived at the station where its rod 101 is brought into axial alinement with the pull rod 37.

Means is also provided by which as each mechanism approaches the station where it is desired to remove a molded sole and replace with an unmolded sole, the molding pressure is automatically released. This is accomplished by means of a cam 130 pivoted at 131 to the stand 1 adjacent to the guide portion 103 thereon. This cam 130, as shown best in Figure 5, is provided with a cam face 135 with which the arm 128 of the locking dog contacts, as the corresponding molding mechanism is moved toward the work removing and replacing station. Just before it reaches this station the arm 128 is in the position shown by the dotted lines in Figure 5, and as it approaches more nearly to this station it rides up the cam face 135, so that it is rocked out of cooperative relation to the ratchet teeth 127, whereupon a pair of springs 140 (see Figure 8) reacting between the yoke 99 and the table portion 5 pull the rod 101 upwardly and raise, and then swing backwardly the upper molding form 80. By automatically releasing the molding mechanism in this manner, impingement of the depressed rod 101 on the raised head 50 as the table is rotated which might cause breakage or other damage is prevented.

Means is also provided whereby at any time desired the operator, while the molding mechanism is in work receiving station, may release the locking dog. For this purpose a push rod 150 (see Figures 1 and 2) is pivoted to the treadle 28 as at 42, this push rod extending through a perforation in the support 48 in a position to impinge on a lug 152, projecting from the cam member 130 where the treadle 28 is permitted to rise. At any time, therefore, while a molding mechanism is at the work removing and replacing station, raising of the treadle 28 acts to release the rod 101 of the mechanism at that station thus to cause the upper form to be removed from cooperative relation to the lower form.

As a matter of convenience to the operator also, means may be provided by which when the treadle 41 has been depressed as far as desired, both treadles may be released simultaneously. For this purpose a release dog 160, as shown in Figures 1, 2 and 9, is pivoted to the upper treadle 41, this release dog having a toe plate 161 engageable by the foot resting on foot plate 162 of the upper treadle, and by which this release dog may be depressed against the pressure of a spring 163 to cause a projecting portion 164 thereon to impinge on the rear end of the dog 30, thus to release this dog from the ratchet teeth 26.

As shown, also, adjacent table sections 5 are formed to interengage for mutual support. For this purpose each is provided with lugs such as 170, 171 found to lap under the edges of adjacent sections, and a marginal lug 172 formed to lap a mating portion of one of the adjacent sections.

Having thus described the embodiment of this invention, it should be evident to those skilled in the art, that various changes and modifications might be made therein without departing from its spirit or scope as defined by the pending claims.

We claim:

1. A machine of the class described comprising a plurality of molding mechanisms arranged in series movable to present said mechanisms successively at one station, each of said mechanisms having a member depressible to place said mechanism in molding condition, a latch for holding each of said member in depressible condition, spring means for moving each of said members upwardly when the cooperative latch is released, a treadle mechanism at said station engageable with each of said members when the corresponding mechanism is at said station and actuable to depressing said member, and a means acting to release each latch when the corresponding mechanism approaches said station.

2. A machine of the class described comprising a stand, a head carried by said stand and rotatable about a vertical axis, a plurality of radially arranged brackets supported by said head, said brackets having sector shaped top portions which together form a table, and a mechanism supported by each bracket, whereby said mechanisms may be presented successively in one position by rotation of said head.

3. A machine of the class described comprising a stand, a mechanism carried by said stand, a treadle pivoted to said stand, means having a lost motion connection to said treadle for actuating said mechanism by depression of said treadle, and a second treadle pivoted to said first mentioned treadle and directly connected to said means to actuate said means independently of said first mentioned treadle for the distance of said lost motion.

4. A machine of the class described comprising a stand, a mechanism carried by said stand, a treadle pivoted to said stand, ratchet mechanism releasably holding said treadle in any depressed position, means having a lost motion connection to said treadle for actuating said mechanism by depression of said treadle, and a second treadle pivoted on said first mentioned treadle and with which said means is in direct connection.

5. A machine of the class described comprising a stand, a mechanism carried by said stand, a treadle pivoted to said stand, ratchet mechanism releasably holding said treadle in any depressed position, means having a lost motion connection to said treadle for actuating said mechanism by depression of said treadle, a second treadle pivoted on said first mentioned treadle, and means on said second treadle actuable to release said ratchet mechanism.

6. In a machine of the class described, a form for supporting articles to be molded, vertically slotted guide blocks positioned on opposite sides of said form, an upper form, a pivot member slidable in the slot of each guide block, means supporting said upper form on said pivot member and normally holding said upper form above and out of vertical alinement with said supporting form, and means actuable to first rock said upper form about the axis of said pivot member to bring said forms into vertical alinement and to then move said pivot members downwardly in said slots to bring said forms into molding relation while maintained in such alinement.

In testimony whereof we have affixed our signatures.

MILTON L. DODGE.
HUGH. A. JORDAN.